Figure 1:
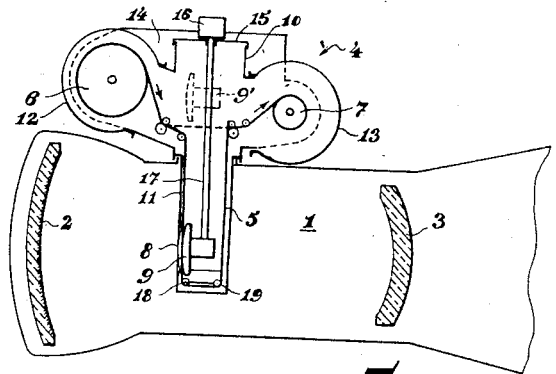

March 24, 1959

R. ZOGLMANN 2,878,733

FILM CONVEYING DEVICE FOR MIRROR CAMERAS

Filed June 7, 1957

INVENTOR.
RUDOLF ZOGLMANN
BY
Wenderoth, Lind & Ponack
Attys 2,878,733

FILM CONVEYING DEVICE FOR MIRROR CAMERAS

Rudolf Zoglmann, Delft, Netherlands, assignor to N. V. Optische Industrie "De Oude Delft," Delft, Netherlands Application June 7, 1957, Serial No. 664,399

Claims priority, application Netherlands June 28, 1956

3 Claims. (Cl. 95—31)

The invention relates to a device for conveying a roll film to and away from the image area in mirror objective cameras. Such cameras generally are provided with a concave mirror which images objects in a curved image surface situated in front of the mirror. In these cameras the image area itself and the means for conveying a strip of film from a supply spool to the image area and from this area back to a take-up spool intercept part of the light rays travelling towards the concave mirror thereby reducing the effective luminosity of the mirror objective system. It will be clear therefore, that it is essential in constructing mirror cameras of this type to reduce the dimensions of the film conveying device to a minimum, at least insofar as those parts of the device are concerned which are located in the path of the light rays during operation of the camera.

In view of this generally the principle is adopted that the roll film is guided within the camera housing in the form of a loop, both the supply spool and the take-up spool being located on one and the same side of the camera housing. On its way to and away from the image area the film is shielded against the light rays by a narrow light channel extending into the camera housing, this channel being provided with an exposure window facing the concave mirror.

With such constructions special means have to be provided for enabling the operator to load the camera with unexposed film. In devices used heretofore it has been customary to arrange the complete film conveying mechanism, including the film spools and the means for pressing the film against the exposure window during exposure, on a frame which is hingedly connected to the remaining camera structure. If the hinge point is suitably located said film pressing means which are situated within the light-tight channel during operation can be swung out of the camera housing through an aperture in the wall of the housing. Then the leading end of the unexposed film can be given the required loop form between the supply spool and the take-up spool and after that the film conveying device is swung back into its operative position.

In practice this film loading procedure has proved to be cumbersome and requiring much time with apparatus of the type just described. Moreover the swaying movements to be made by the bulky film conveying mechanism require a relatively large space. Finally, if the camera is to be loaded in a room which cannot be darkened, there is a relatively great loss of film due to the fact that the leader of the roll film must be unrolled over a great length in order that the loop may be formed and the leader be fastened on the take-up spool.

The invention has for its primary object to avoid these drawbacks. To this end, according to the invention, the means for pressing the film against the exposure window during exposure are mounted on one end of a retractable rod extending longitudinally through the light-tight channel. The rod is adapted to be withdrawn from the channel at least so far as to enable the operator when loading the camera, to pass the filmleader between the pressing means and the camera housing before attaching the leader to the take-up spool. Thus, the film can simply be guided along a substantially straight line between the spools by the operator and the required film loop is formed afterwards by returning the rod to its operative position, the pressure plate thereby pulling the film into the light-tight channel.

Figure 2:
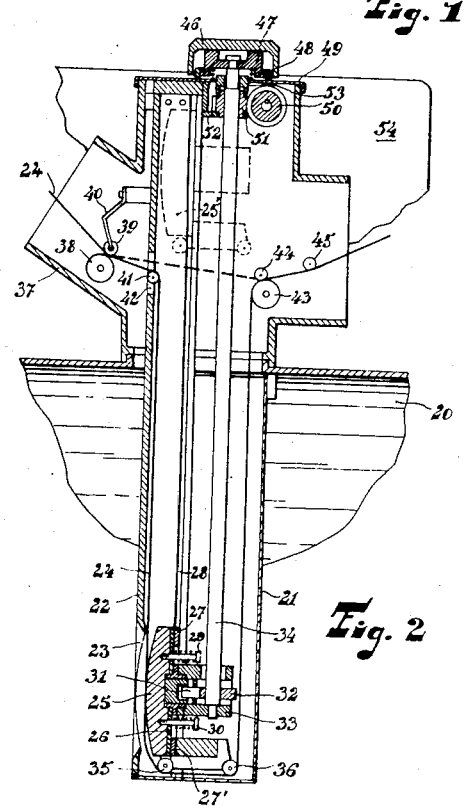

The invention will be described in greater detail hereafter with reference to the drawing, in which Fig. 1 is a schematic longitudinal section of a mirror objective camera provided with a film conveying device according to the invention and shows the general arrangement of the device, and Fig. 2 is a section on an enlarged scale of the film conveying device showing the essential parts of the device.

Referring to Fig. 1, 1 is the housing of the camera whose image forming element is the concave spherical mirror 2. The mirror is corrected for spherical aberration in a well-known manner by a meniscus shaped corrector lens 3 whose surfaces are concentric to the spherical mirror 2. The image formed by the mirror 2 of an object situated in front of the cameras covers spherical surface 8 and during exposure the film 5 must be given a curvature exactly corresponding to that of the focal surface in order to obtain sharpely defined pictures.

To this end mirror cameras generally are provided with a pressure plate 9 of the required shape movably mounted behind an exposure window and adapted to press the edges of the film against said exposure window.

The film conveying device generally indicated in Fig. 1 as 4, comprises a supply spool 6 and a take-up spool 7 for the roll film. A light-tight channel 11 extends to the image area 8 through an aperture in the camera housing and shields the film 5 on its way through the camera against incident light.

It will be observed that the obstruction offered by the film channel to the light beams entering the system is minimized by that both the supply and the take-up spool are located on one side of the camera housing, as now the film channel need not be extended to the opposite wall of the camera.

The film spools are detachably mounted in disk-shaped boxes 12 and 13 respectively which can be fixed to extensions of the housing 10 of the device. In the housing sets of rollers are provided as shown for guiding the roll film, whereas an electric motor and suitable gearings for driving the take-up spool and other mechanical parts may be arranged in a compartment 14 of the housing.

The pressure plate 9 to which a pair of film guiding rollers 18 and 19 is fixed is mounted on one end of a rod 17 which extends longitudinally through the channel 11 and is slidably passed at its upper end through a cover 15 of the housing 10. The rod 17 terminates in a handling knob 16, at which it may be pulled out into a position in which the pressure plate is at the place indicated in dotted lines at 9. As will be more fully explained in connection with Fig. 2 suitable means for guiding the pressure plate during its withdrawal from the channel 11, may be arranged in the channel and in the housing 10.

Now the purpose of the invention may be easily understood as follows. When a new film is to be inserted in the camera the rod 17 is retracted so as to bring the pressure plate 9 into the position shown in dotted lines. Then the film magazine 12 is removed and a new film supply spool is inserted. The film is unrolled a sufficient length to enable the operator to introduce the leading end between the left hand pair of guiding rollers. The supply magazine may then be replaced. Next the take-up magazine 13 is removed and the film leader is taken up and passed between the right hand pair of guiding rollers and finally attached to the take-up spool 7. This work may be facilitated by introducing a pair of tweezers between said guiding rollers from the right and picking up the leader. The take-up magazine 13 is then refixed to the housing 10 and it will be understood that the film extends now along the dotted line indicated in the drawing.

The film loop 5 is now formed by simply pushing the rod 17 together with the pressure plate 9 back to its operative position, guiding rollers 18 and 19 thereby pulling out the film to the required extent.

Some constructional details of the device according to the invention will be further explained with reference to Fig. 2. The general arrangement is similar to that of Fig. 1. The film conveying device comprises a housing 37 in which guiding rollers 38, 39, 41, 43, 44 and 45 for the film 24 are mounted. The supply and take-up magazines which may be easily attached to the left hand and right hand side respectively of the housing 37 have been omitted from the drawing for the sake of clarity. In the upper part of the housing sufficient space is provided for receiving the pressure plate assembly when in retracted position. The housing 37 is at its upper end sealed with a cover 49 through which the retracting rod 34 extends.

A U-shaped member 22 forming the wall of the light-tight channel which is facing the concave mirror is fixed to the housing 37 and extends through an aperture in the wall of the camera-housing 20 of which only a part is shown. An exposure window 23 is arranged in said U-shaped member at the image area of the camera. The other walls of the light-tight channel are formed by a second U-shaped member 21 which is fixed to the camera wall and receives the U-shaped member 22 so as to shut off incident light rays.

The pressure plate 25 is provided with a number of spring-loaded bolts or studs such as 29 and 30. The springs are pressure springs tending to hold the pressure plate 25 against a fixed plate 26 which is connected to the frame 33 bearing the lower end of the rod 34. The latter carries an eccentric 32 cooperating with a roller 31 mounted in the movable part of the assembly. Thus, when the rod 34 is rotated the pressure plate 25 is periodically pushed to the left by the eccentric 32 and then driven back to the retracted position shown by the springs mounted on the bolts 29 and 30. The frame 33 and the back plate 26 connected thereto are held in fixed position with respect to the exposure window 23 by a set of two strips 27 and 27' which project laterally at both sides of the plate and are guided by grooves such as 28 in the side walls of the U-shaped member 22. These grooves extend up to the top of the housing 37 and are effective in guiding the pressure plate assembly each time when the latter is retracted for loading a new film in the device.

The required rotation of the rod 34 may easily be derived by giving the rod e.g. a square cross section and arranging a worm wheel 51 having a square central aperture in the upper section of the housing 37. The worm wheel 51 is rotatably supported by fixed members 52 and 53 and engages a worm 50 which is driven by an electric motor (not shown) placed in the housing 54.

The handling knob 46 is internally provided with a part 47 serving as an upper bearing for the rod 34 and having lateral extensions at its bottom which cooperate with extensions 48 on the cover 49 of the housing in the manner of a bayonet joint. Thus the rod 34 may be pulled out after the knob has simply been turned through a certain angle and is locked again upon completion of the loading operation by rotating the knob in the reverse direction.

The operation of the device will be clear after what has been said in respect of Fig. 1. Attention may be drawn to the fact that the roller 39 is supported by blade springs such as 40 in order to facilitate the insertion of the film leader between the rollers. Of course, the same may be done for roller 44.

What I claim is:

1. In a mirror objective camera the combination of a camera housing, a film magazine which is light-tight and is positioned outside said camera housing in fixed relation to said camera housing, a film supply and a film take-up spool in said magazine, said camera housing having an aperture in the wall thereof communicating between the interior of said film magazine and said camera housing, a light-tight channel having an exposure gate in a wall thereof extending between said aperture and the image area of the camera for receiving a film loop formed between said supply and said take-up spool, a first film guiding means in said film magazine in fixed relation to said film magazine, pressing means including a pressure plate located in said light-tight channel opposite said exposure gate for pressing said film into the curved shape required during exposure, a second film guiding means in said light-tight channel in fixed relation to said pressing means, a rod extending longitudinally through said channel, means for retracting said rod from said channel, said pressing means and said second film guiding means being mounted on one end of said rod to lift said pressing means and said second film guiding means through said aperture into said film magazine, whereby the film may be passed from said supply spool to said take-up spool via said first film guiding means in said magazine when the rod is in retracted position and is automatically drawn into the light-tight channel in the form of a loop by said second film guiding means when said rod is returned to its operative position.

2. In a mirror objective camera the combination as claimed in claim 1 wherein said retractable rod is the driving shaft of said pressing means.

3. In a mirror objective camera the combination as claimed in claim 2 wherein said retractable rod is slidably received for simultaneous rotation by a motor driven gear supported in said film magazine.

References Cited in the file of this patent

UNITED STATES PATENTS 2,789,489     Zwakenberg et al.  _____ Apr. 23, 1957

OTHER REFERENCES

Philips Technical Review, vol. 13, April 1952.